United States Patent [19]

Campau

[11] Patent Number: 5,634,592
[45] Date of Patent: Jun. 3, 1997

[54] FLOW CONTROL APPARATUS AND METHOD FOR MAKING SAME

[75] Inventor: Daniel N. Campau, Grand Rapids, Mich.

[73] Assignee: Flow-Rite Controls, Ltd., Grand Rapids, Mich.

[21] Appl. No.: 441,482

[22] Filed: May 15, 1995

Related U.S. Application Data

[63] Continuation-in-part of Ser. No. 231,742, Apr. 7, 1994, Pat. No. 5,542,605, and a continuation-in-part of Ser. No. 321,532, Oct. 11, 1994, abandoned.

[51] Int. Cl.$^6$ ................................................ A24F 25/00
[52] U.S. Cl. ................................ 239/51; 239/68
[58] Field of Search ........................ 239/6, 67, 68;
222/70, 187, 416; 137/124; 73/37, 146.8,
202, 226, 438, 861.01, 861.52; 29/237,
508, 753

[56] References Cited

U.S. PATENT DOCUMENTS

| | | |
|---|---|---|
| 1,293,017 | 2/1919 | Broche . |
| 2,991,911 | 7/1961 | Spain . |
| 3,216,663 | 11/1965 | Frampton et al. . |
| 3,430,823 | 3/1969 | Hunsaker . |
| 3,941,283 | 3/1976 | Garbe . |
| 4,042,150 | 8/1977 | Roos . |
| 4,249,559 | 2/1981 | George . |
| 4,542,762 | 9/1985 | Littlehale . |
| 4,938,420 | 7/1990 | Ruttenberg . |
| 5,007,667 | 4/1991 | Unewisse et al. ................. 29/508 |
| 5,238,187 | 8/1993 | Zlotnik et al. . |

FOREIGN PATENT DOCUMENTS

| | | |
|---|---|---|
| 392556B | 1/1983 | Austria . |
| 3038662A1 | 10/1980 | Germany . |
| 2083993 | 9/1981 | United Kingdom . |
| PCT/US88/03809 | 6/1989 | WIPO . |

*Primary Examiner*—Robert J. Oberleitner
*Assistant Examiner*—Pamela Lipka
*Attorney, Agent, or Firm*—Niro, Scavone, Haller & Niro

[57] ABSTRACT

Flow restrictors are provided with known flow rates at given pressures. A flow restrictor is surrounded by a tubular sleeve having open ends. A fluid such as air is supplied through the restrictor, and the sleeve is simultaneously compressed, until a predetermined pressure across the restrictor is reached, at which time compression is stopped.

9 Claims, 6 Drawing Sheets

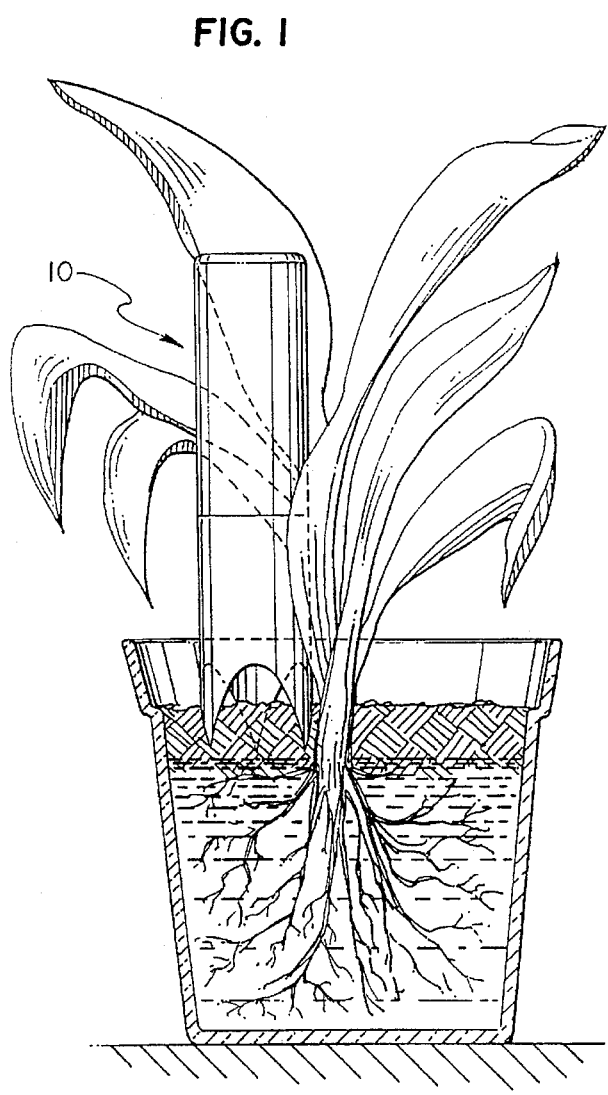
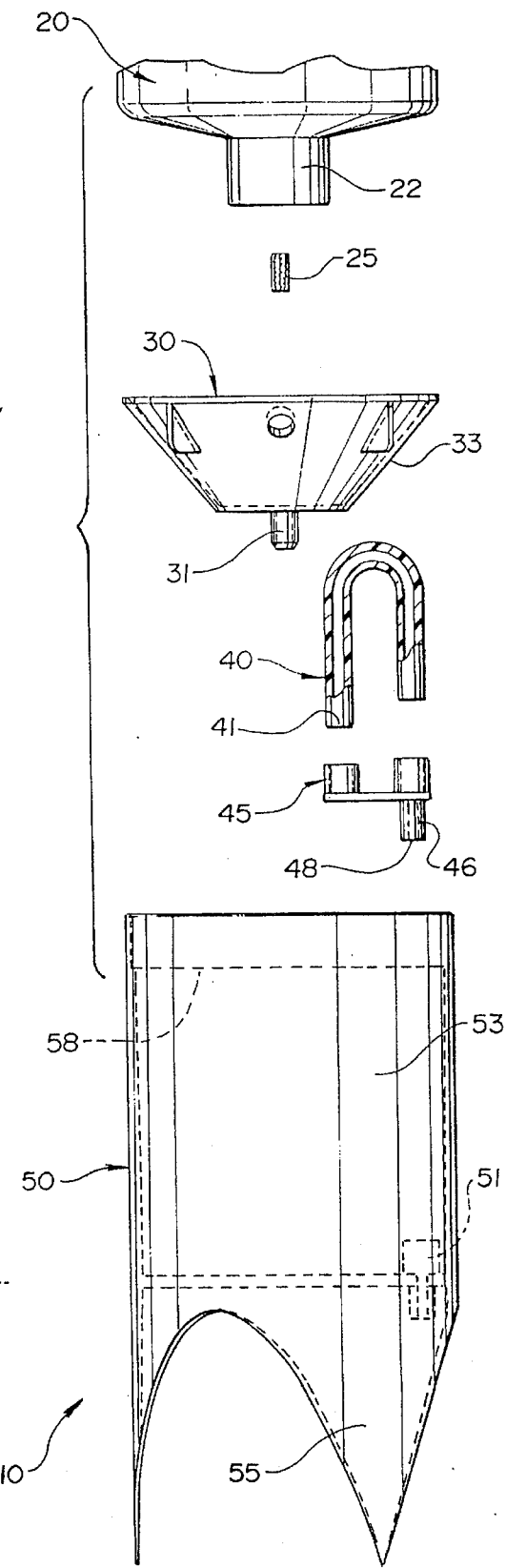

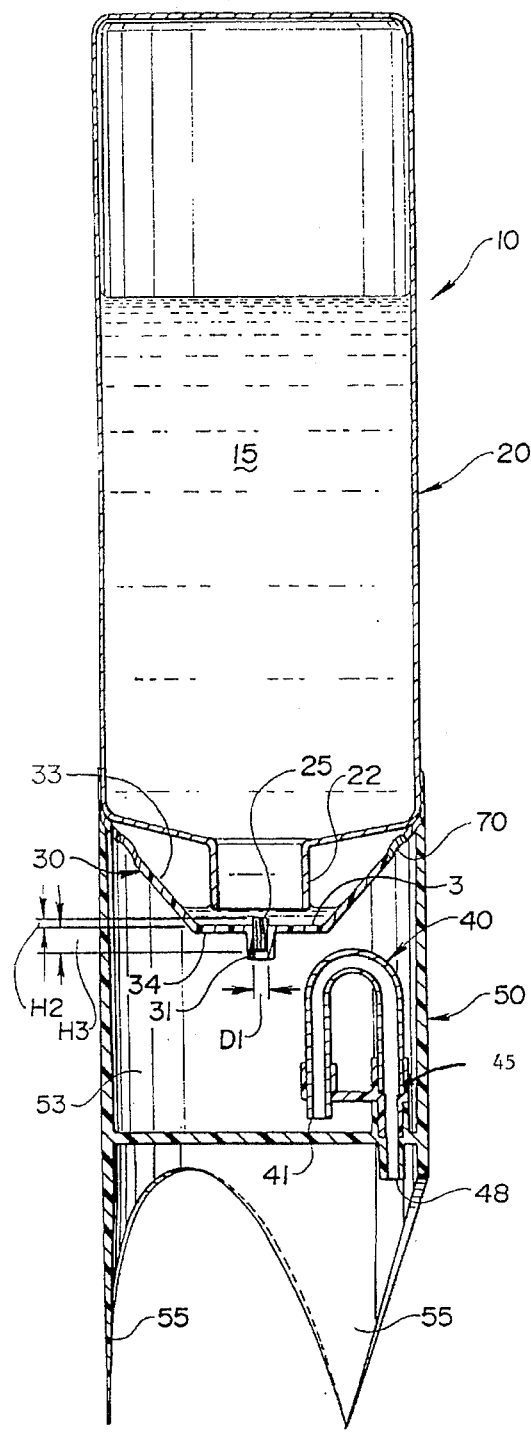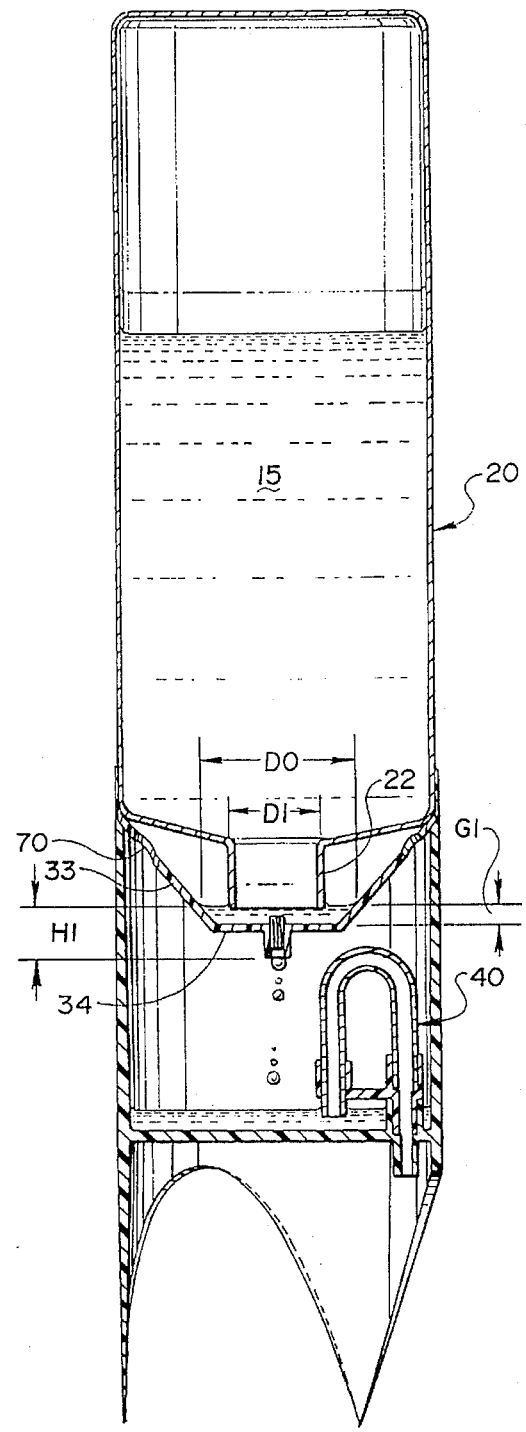

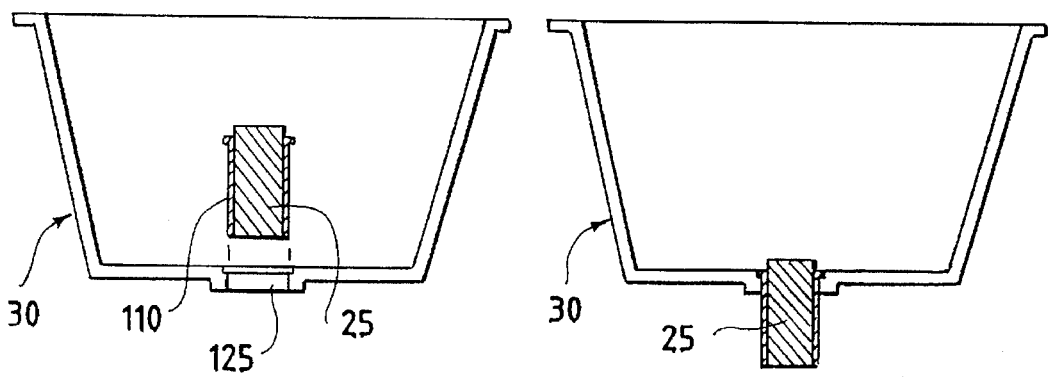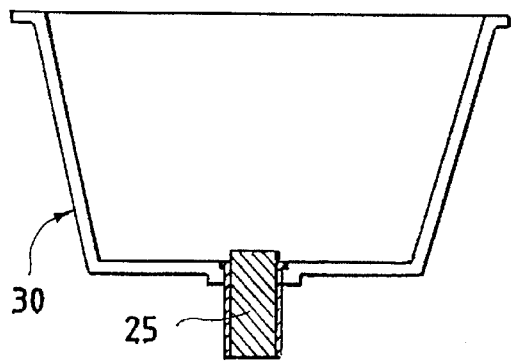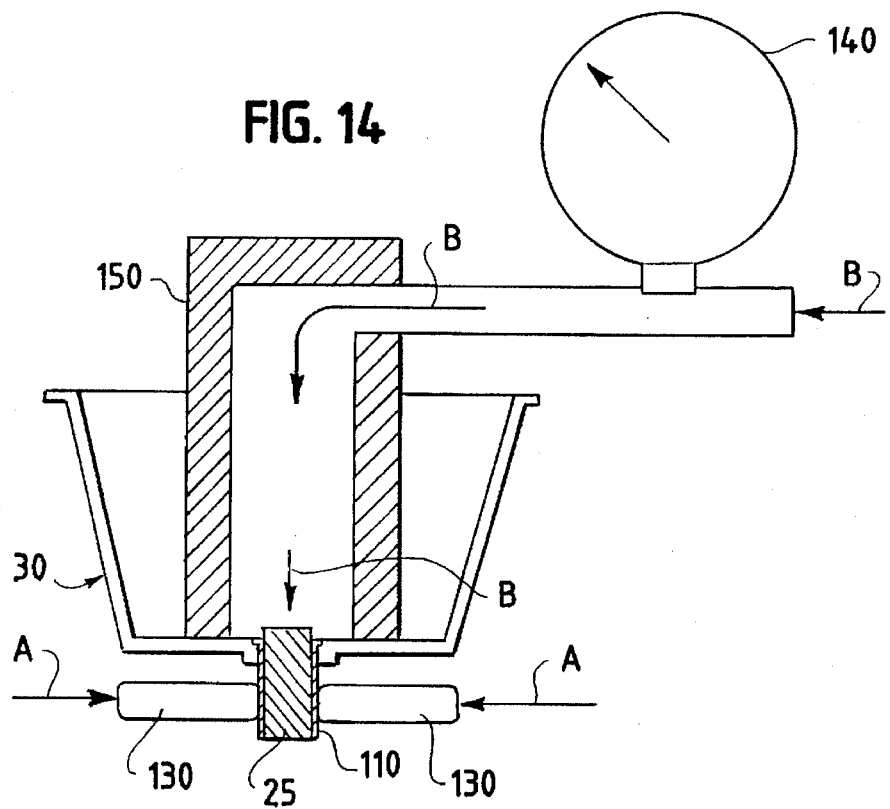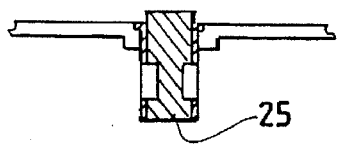

FLOW CONTROL APPARATUS AND METHOD FOR MAKING SAME

This application is a continuation-in-part of U.S. Ser. Nos. 08/231,742, filed Apr. 7, 1994, and titled "Automatic Liquid Dispenser," now U.S. Pat. No. 5,542,605, and is also a continuation-in-part of U.S. Ser. No. 08/321,532, filed Oct. 11, 1994, and titled "Automatic Liquid Dispenser", now abandoned. U.S. Pat. Nos. 5,409,135 and 5,353,957, and U.S. Ser. No. 08/321,532, are hereby incorporated by reference into this application.

BACKGROUND OF THE INVENTION

The inventions referred to above relate generally to a liquid dispenser and, more particularly, to an automatic liquid dispenser useful in a variety of applications in which a constant volume of liquid needs to be dispensed at periodic time intervals. The present invention relates generally to flow controls which effect fluidic system response and, more specifically, to a process for making flow restrictors having predetermined flow rate versus pressure drop characteristics. In one application, the flow restrictors made according to the present invention find advantageous use with my automatic liquid dispensers referred to above.

Dispensing liquids on a periodic basis is a common task around the home, workplace, or laboratory. Typical applications that require liquid to be dispensed in a controlled fashion include plant watering/feeding, fertilizing, air freshening, drain cleaning, toilet bowl cleaning, pet watering, medicating, lubricating, humidifying and fumigating.

Devices for restricting flow, such as orifices and capillary tubes, are well known. To achieve high resistances to flow, however (such as required in the microflow dispensing apparatuses of my inventions referred to above, and specifically described below), extremely small orifices or extremely long capillary tubes are required. These types of flow restrictors can also be expensive to manufacture, and can be easily clogged.

I have previously determined that certain materials, such as compressed fibers, can be used as flow restriction devices where very high flow resistance is necessary. However, flow restrictors, particularly those used for dispensing at microflow rates, typically must be set very accurately, since the performance of the individual dispenser can otherwise vary widely. Accordingly, the high volume yet economical production of precision-set flow restrictors is necessary.

A flow restrictor can be fabricated by pulling a fibrous cord material through a sleeve having a diameter less than that of the cord, thereby compressing the cord fibers. However, manufacturing variations in cord tension, sleeve and cord diameters, and cord density can cause wide variations in flow restrictor performance. Thus, while the flow restrictor disclosed in U.S. Ser. No. 08/231,742 has met with some success, some disadvantages associated with consistent performance still exist.

It has been found that if certain materials, such as a fibrous cord, are compressed within a loose-fitting metal sleeve, some improvement in the fabrication of consistent flow restrictors is achieved. However, the cord density and sleeve dimensional tolerances were still found to result in the fabrication of flow restrictors with disadvantages concerning consistent performance.

The present invention concerns an improved flow control device to overcome certain disadvantages associated with flow restrictor performance.

SUMMARY OF THE INVENTION

In accordance with the present invention, an improved flow control device is provided that preserves the beneficial features and advantages of known flow control devices while at the same time overcoming disadvantages and achieving additional advantages, such as the provision of a flow restrictor with a simple economic construction that provides consistently reliable and quantifiable flow rates for given pressure drops.

In the preferred embodiment of the present invention, a method is provided for making a flow control device having a predetermined flow rate. The method includes the step of placing a compressible flow restrictor within a tubular sleeve having an axial length and open ends. In its axial direction, the sleeve entirely surrounds the outside periphery of the flow restrictor, not including the ends. Next, the sleeve is radially compressed in a direction transverse to the axial direction of the sleeve. Simultaneous with the sleeve compression, air is supplied at a predetermined rate through the open ends of the sleeve. The air pressure drop across the flow restrictor is measured during sleeve compression. Finally, sleeve compression ceases when a predetermined air pressure is reached, resulting in a flow restrictor which provides known flow rates at given pressures.

In one preferred embodiment, adjustably controlled crimping jaws are used to accomplish sleeve compression. It is also preferred that the predetermined air flow rate be adjustably controlled, as well. Then, the sleeve compression controls and the air flow rate controls can be linked (through mechanical, electrical or fluidic controls), so that once a predetermined air pressure drop across the restrictor is reached, sleeve compression will cease.

An automatic liquid dispensing apparatus for the microflow dispensing of a controlled volume of liquid, using this improved flow restrictor, also forms a part of the present invention. In the preferred embodiment, a container adapted to hold a dispensable liquid and a flow regulator in fluid communication with the container are provided. The flow regulator is configured to permit a controlled rate of flow of the liquid out of the container; this controlled rate is independent of the liquid level within the container. A compressible flow restrictor is associated with the flow regulator. The outside periphery of the flow restrictor is entirely surrounded by a tubular sleeve having open ends. An air flow is provided through the sleeve and the flow restrictor. Compression ceases when a predetermined air pressure across the restrictor is reached. The resulting flow restrictor provides known flow rates at given pressures.

BRIEF DESCRIPTION OF THE DRAWINGS

These and other features, objects, and advantages of the present invention will become apparent from the following description of the drawings wherein like reference numerals represent like elements in the several views, and in which:

FIG. 1 is a side perspective view of a liquid dispenser of my design shown mounted within the soil of a potted plant;

FIG. 2 is an exploded partial cross-sectional view of the liquid dispenser, showing the various components prior to assembly;

FIG. 3 is a side cross-sectional view of the components of the liquid dispenser shown in FIG. 2, as assembled;

FIG. 4 is a side cross-sectional view similar to FIG. 3 in which liquid has been dispensed from the container, through flow regulator 30, and into timing and dispensing assembly 53;

FIG. 12 is a side, cross-sectional view of a "cup-shaped" flow regulator of my design with a fibrous cord being inserted into the metal sleeve;

FIG. 13 is a view similar to FIG. 12 with the sleeve and fibrous cord assembly pressed into the aperture of the flow regulator;

FIG. 14 is a side, cross-sectional view of one embodiment of the present invention, in which the sleeve/cord assembly is subjected to controlled air flow, while being subject to mechanical pressure;

FIG. 15 is a side, cross-sectional view of the lower portion of the flow regulator shown in FIGS. 12-14, illustrating the sleeve/cord assembly following the application of mechanical pressure.

DETAILED DESCRIPTION OF THE PREFERRED EMBODIMENT

Figure 5:
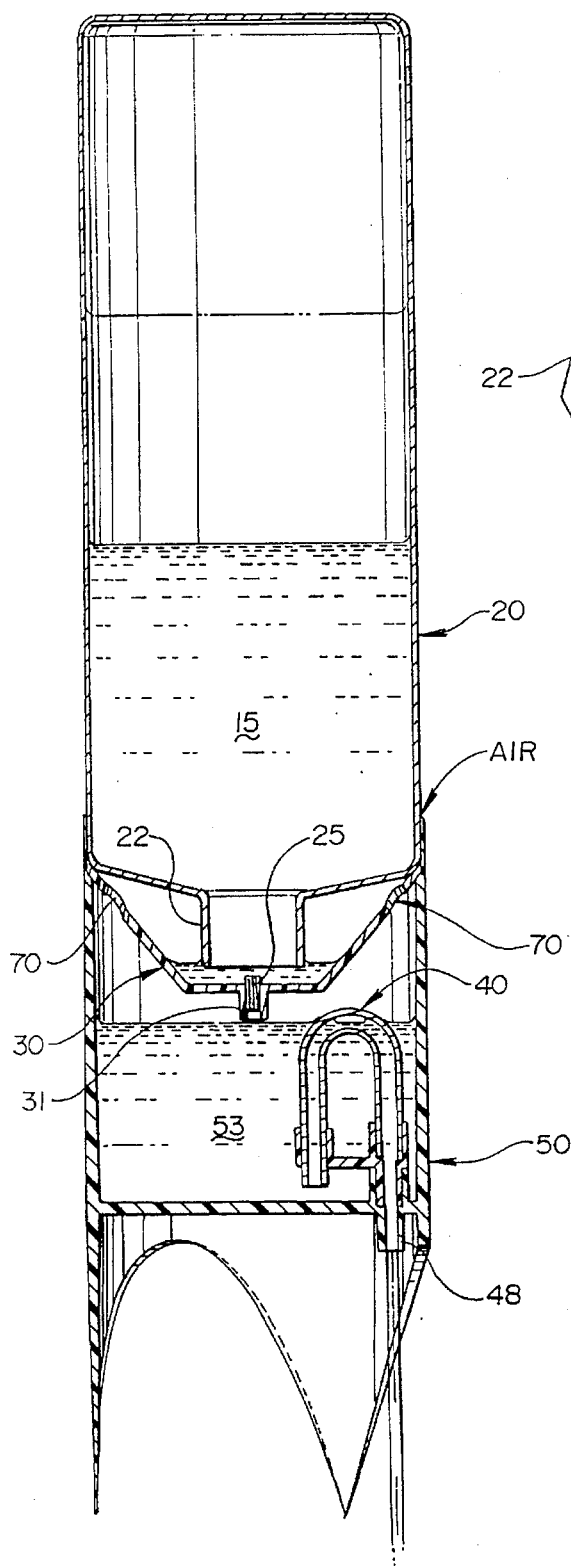
FIG. 5 is a side cross-sectional view similar to FIG. 3 in which water is being dispensed from timing and dispensing assembly 53.

For background purposes, the structure and operation of automatic liquid dispensers of my design will be described with reference to two specific applications (a plant waterer, and an air freshener). Following that description, my improved flow restrictor and method, which forms the subject of the present invention, is described under the heading "Improved Flow Restrictor."

One preferred embodiment of the automatic liquid dispenser apparatus of my design, a plant waterer, is shown generally as 10 in FIG. 1. Referring to FIGS. 2 and 3, liquid dispenser 10 includes a liquid storage container, generally designated 20, which houses liquid 15. Container 20 includes nozzle sidewalls 22 and is positioned above and in press-fit relationship with a mounting base, generally designated 50, having an annular rim 58 (FIG. 7) for seating the sidewall portions of container 20 which press-fit with mounting base 50. Mounting base 50 includes a static timing and dispensing assembly 53 and mounting prongs 55. A cup-shaped static flow regulator, generally designated 30, and having tapering sidewalls 33, a planar bottom surface 34, and a flow regulator discharge port 31 is press-fit into the upper portion of mounting base 50, as shown in FIG. 3. ("Static" is used here to mean that the flow regulator 30 and timing and dispensing assembly 53 are non-moving assemblies which include no moving parts, such as gears, pistons, pumps, etc.)

Tube retainer housing, generally designated 45, is fixably connected to a lower portion of timing assembly 53, and includes an annular boss 46 which assembles in a press-fit relationship into a corresponding recess 51 on mounting base 50. An inverted U-shaped tube 40 interconnects in a press-fit relationship with tube retainer housing 45, as seen in FIG. 3. Finally, hydrophilic restrictor 25 is inserted in a press-fit relationship within a portion of flow regulator port 31, as shown in FIG. 3, and as more specifically described below.

In order to use plant waterer 10, dispenser apparatus 10 is inverted, and mounting prongs 55 are implanted within the soil of the potted plant, as shown in FIG. 1.

The operation of my automatic liquid dispenser can best be seen in FIGS. 3-5, and will now be described in general terms. A two-step operation occurs in which a constant volume of liquid ("V") is dispensed, at periodic intervals ("$\Delta T$"), from liquid dispenser 10. In the first stage, flow regulator 30 is in communication with container 20 and controls the rate of flow ("q") out of the container. Depending on the particular application and the type of flow regulator 30 used, the period can increase, remain constant, or decrease as the liquid level in container 20 drops, as is explained below. Liquid from flow regulator 30 is conducted into a second flow control stage, within timing and dispensing assembly 53. Timing assembly 53 accumulates this liquid until volume V is reached, at which time this volume of liquid V is caused to flow out of timing assembly 53, producing the desired intermittent dispensing of a constant volume.

Referring to FIGS. 3-5, the operation of my automatic liquid dispenser will now be described in more specific terms. Initially, liquid falls by gravity from storage container 20 into cup-shaped flow regulator 30. This (first stage) flow continues until the liquid level in flow regulator 30 obstructs the entry of air between container nozzle side walls 22 and flow regulator side walls 33 (as shown in FIG. 4). When this occurs, outside air can no longer enter container 20, preventing further flow out of container 20 and into flow regulator 30. Hydrophilic fibrous restrictor 25, located within flow regulator port 31, acts as a flow restrictor while permitting a continuous flow from container 20 through flow regulator 30 and into timing and dispensing assembly 53.

Accurate timing and controlled dispensing are achieved by using timing and dispensing assembly 53, which contains inverted U-shaped tube 40. Liquid from flow regulator 30 flows into timing and dispensing assembly 53, and flow out of timing assembly 53 is prevented until the liquid level within assembly 53 rises above inverted U-shaped tube 40. Inlet port 41 of U-shaped tube 40 is open and is located near the bottom of timing and dispensing assembly 53, while the other end of U-shaped tube 40 passes through the wall of timing assembly 53 and terminates in an open outlet or discharge port 48 located below the bottom of timing and dispensing assembly 53. As the liquid level rises in timing assembly 53, it also rises in U-shaped tube 40, entering through open end 41. Once the liquid level rises to the top of U-shaped tube 40, it spills over and flows out the other side of U-shaped tube 40. Since outlet port 48 is below the lowest liquid level in assembly 53, U-shaped tube acts as a siphon and assembly 53 is drained to the level of inlet opening 41. In this fashion, the dispensed volume, established by the height of the U-shaped tube, is dispensed intermittently. Further, the dispensing cycle period is uniform since the flow into assembly 53 from flow regulator 30 is the same from one period to the next, as described more specifically below.

It will also be understood that liquid within the flow regulator can be re-introduced back into the container. This will occur when the air volume in the container contracts due to a temperature decrease in the air. In this event, flow into and out of the flow regulator can occur with a minimal change in hydraulic head acting on flow regulator discharge port 31. This permits the flow of liquid out of the flow regulator to be maintained at a relatively constant rate.

Figure 10:
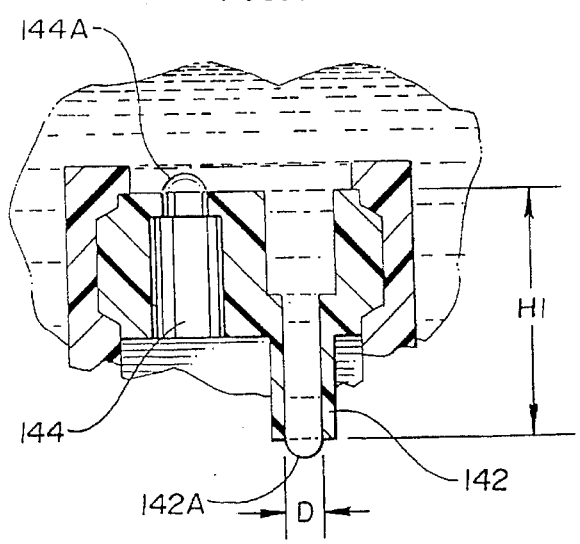
FIG. 10 is an exploded cross-sectional view of a portion of the liquid dispensing apparatus disclosed in U.S. Pat. No. 5,409,135.

My co-pending applications, referenced above, illustrate a method of regulating the flow of liquid from a container independent of the liquid volume in the container. In general, this method uses two openings positioned at the bottom of the liquid container, and spaced apart vertically by a small distance, as shown in FIG. 10. This height differential gives rise to a steady flow rate out of the container, independent of the liquid head in the container (see FIG. 9). As explained in those co-pending applications, the flow rate is controlled by the differential height between the openings, the geometry of the openings, and the physical properties of the liquid. I have found that this flow rate can be described accurately by the formula $$q = K * (H1 - C_n - C_v)$$

where

K=coefficient dependent on the path through the nozzle ($K = \Pi \rho g D^4 / 128 L \mu$, for laminar flow in tubes)
$\rho$=fluid density, slugs/in$^3$
g=gravitational constant, 386.4 in./sec$^2$
D=nozzle tube bore diameter (inches)
L=nozzle tube length (inches)
$\mu$=dynamic viscosity of liquid, lb.sec./in.$^2$
H1=differential in height between two openings
$C_v$=constant due to surface tension resistance to flow at the air vent port, expressed as a loss of head (inches)
$C_n$=constant due to surface tension resistance to flow at the nozzle outlet port, expressed as a loss of head (inches)

Figure 8:
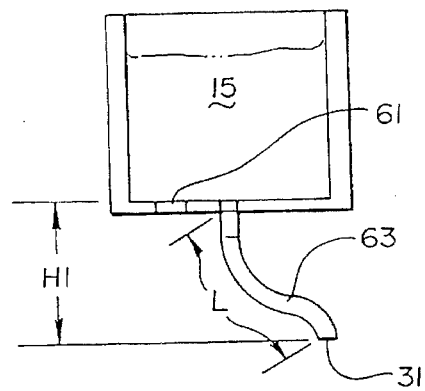
FIG. 8 is a diagrammatic view of a selected portion of a flow regulator according to my design illustrating a curved liquid discharge tube.

Since all of the variables are known except $C_v$ and $C_n$, the combined effect of surface tension acting at both the nozzle outlet and air vent port (as shown at FIG. 10) can be determined experimentally by measuring the flow rate for a given differential height, H1, and calculating a constant $C = C_v + C_n$. The equation for flow can then be simply written q=K(H1-C). The desired flow rate can easily be achieved by adjusting H1, D or L as required. As long as the vent port diameter and the nozzle drop formation diameter do not change, the surface tension effect will be accurately accounted for by the experimental value for C. (Note that L and H1 are not necessarily the same since the nozzle tube can be coiled or spiraled to increase its liquid flow path without changing its overall height, as shown in FIG. 8.)

When very low flow rates ("microflow" rates will be termed here as rates of about 0.3 millimeters per hour, or six drops per hour, or less) of low viscosity liquids are needed, however, two problems arise with the flow regulator described in my co-pending applications (and shown in FIGS. 9 and 10), which are solved by my automatic liquid dispenser, disclosed here. The first problem is that the coefficient K can increase dramatically ("the K increase problem"), requiring a long, small diameter tube to produce the necessary flow restriction. This results in a loss of self priming capability, causing flow to stop due to surface tension resistance of trapped air in the tube. The second problem occurs when the ambient temperature varies ("the temperature cycling problem"), which can result in inaccurate flow rate regulation. The causes of each of these problems, as well as an explanation of how my automatic liquid dispenser solves these problems, now follows.

Regarding the K increase problem, a comparison of the K values for the relatively high viscosity glycerin/water solution (discussed in my co-pending applications) with water shows the following:

Glycerin/water solution: $\mu/\rho = 174.9(10^{-3})$in.$^2$/sec. $\rightarrow K_G = 54.223 \; D^4/L$ Water: $\mu/\rho = 1.515(10^{-3})$in.$^2$/sec $\rightarrow K_W = 6.260(10^3) D^4/L$ To achieve the same flow rate with water as with glycerin/water, under the same H1, requires equal coefficients ($K_W = K_G$), ignoring small surface tension differences. This requires the $D^4/L$ ratio for water to be smaller than the $D^4/L$ for glycerin/water by a factor of $54.223/6.260(10^3) = 8.622 (10^{-3})$. To take a specific example, if, for glycerin/water, values of D=0.045 inches and L=0.5 inches are used to produce a flow rate q, then a pair of D and L values that would produce the same flow of water are D=0.031 inches and L=13 inches. Assuming a tube of length L=13 inches could be coiled so that the vertical height between the ends would be just H1=0.5 inches (i.e., the same H1 as for the glycerin/water application), this length may be practical in some applications, but for many applications, it presents the difficulty that in order to operate, the tube of length L must be primed, or filled with liquid. If not solidly filled with liquid, the flow could be effectively blocked by trapped air which increases surface tension resistance.

Therefore, for low flow, low viscosity applications, a self-priming means is needed to assure proper operation. If a smaller diameter D is chosen, a shorter length L could be used, but the possibility of plugging increases, particularly with tap water. Even with a small diameter D, the surface tension resistance from any trapped air would still prevent self-priming. An effective solution to this problem has been found: the use of a hydrophilic fibrous material as a self-priming restrictor.

As shown in FIGS. 3–5, hydrophilic restrictor 25 projects into the liquid at its upper end so that it is effectively wetted by the liquid. Hydrophilic restrictor 25 is preferably pressed into the controlled diameter of flow regulator port 31 to set the desired flow restriction. Capillary action causes the liquid to be drawn down the restrictor so that head H1 develops, assuring continued flow and eliminating air locks. This also has the advantage that the fibrous material can be selected and controlled to have high flow resistance in a short length. This allows a compact overall size, even for low viscosity liquids. The flow resistance of the restrictor can be controlled by selecting the bore diameter of flow regulator port 31 (D1, as shown at FIG. 3) to be smaller than the diameter of restrictor 25, so that the fibers are squeezed a controlled amount upon assembly. It has been found especially practical to control the flow rate, q, by changing only this interference fit relationship. Changing only bore diameter D1 also makes it easier to tool and manufacture a family of dispensers with different flow capacities.

The flow characteristic for flow regulator 30 with hydrophilic restrictor 25 has been found to be of the form q=K * (H1-C). The coefficient K can be determined experimentally by measuring the flow at at least two points and calculating the values of K and C. The surface tension constant C would be the same as previously determined if the air vent port diameter, drop formation diameter and liquid were the same. With felt and cotton ¼ inch diameter cord fiber restrictors, it has been found that self-priming is assured when H2 is about ⅛ inches, and H3 is 0.375 inches ($H_2$ and $H_3$ are shown at FIG. 3). Flow rates of ½ mL/hr. to 2 mL/hr. of water can be achieved with D1=0.140 to 0.160 inches, when H1=0.5 inches (see FIG. 4).

Hydrophilic restrictor 25 may be made of any material that is not adversely affected by exposure to the liquid, as long as it is hydrophilic in aqueous solutions to allow capillary action to establish the head necessary for steady flow. Natural fibers such as wool, felt and cotton function well, though it is desirable to pre-shrink natural fibers for stable performance. Porous plastic, polyester, porous ceramic or porous metallic materials may also be used, either alone (if treated to be made hydrophilic), or in combination with a natural fiber. Porous plastic may be preferred since it can be molded to the proper shape and porosity, although it is more costly than natural fiber woven or pressed cord materials.

The temperature cycling problem must also be addressed. Heat transfer into or out of container 20 expands or contracts the air inside the container. Due to the typical operation of thermostats, there is a repeated temperature swing in most rooms that can add to or reduce the effective head acting on the outlet, causing a variation in flow rate. When air temperature increases, for example, the air pressure increases and the flow rate increases until equilibrium is once again established, and flow returns to the design rate. Conversely, when temperature decreases, the air in the container contracts, lowering the pressure inside the container and reducing the flow rate, until equilibrium is established and flow again returns to the design rate. The degree of variation in flow rate depends on the volume of air inside the container. If the container is nearly full of liquid, the effect is small. Thus, as the container empties, the overall average flow rate is greater near the end of the service life of the container of liquid. This may often be an undesirable effect, but it does provide a way of introducing (for example) a higher concentration of scent molecules over time for liquid air freshener applications.

The magnitude of the temperature cycling problem can be estimated from the ideal gas law: $PV/T=Constant$. Therefore, for a change in temperature $\Delta T$ of air inside a container there will be a change in air pressure $\Delta P=\Delta T * P/T$ inside the container. The volume of air can expand to reduce this pressure increase only by pushing liquid out of the container. The volume of liquid pushed out (to restore equilibrium) can be approximated by assuming this occurs at a constant temperature, so that $\Delta V=\Delta P * V/P$, where V is the volume of air in the container. $\Delta V$ must be expelled by an increase in flow rate before equilibrium can be re-established. The increase in pressure, $\Delta P$, is a function of the temperature change, independent of the volume V. But the volume change, $\Delta V$, is a direct function of the volume of air in the container. As V increases, the volume change due to temperature change increases, and the variation in flow also increases.

For large containers, this effect could be unacceptable, even in air freshener applications. This is shown, by way of example, through the effect of a 5° F. temperature increase on a 32 ounce container, at different air/liquid ratios. Initially, the filled container may have 1 oz. of air and 31 oz. of liquid. For nominal conditions of P=14.7 psi. and T=530° R., $\Delta P=5*(14.7/530)=0.139$ psi. and $\Delta V=(0.139)(1/14.7)=0.009$ oz. At the other extreme, the volume of air may be 31 oz. with just 1 oz. of liquid remaining. In this case, the 5° F. temperature increase still produces a pressure increase, $\Delta P=0.139$ psi, but now the volume change needed to restore equilibrium is $\Delta V=(0.139)(31/14.7)=0.292$ oz. Since this effect can occur repeatedly during the product life, the cumulative effect on the accuracy of dispensed volume can be very significant. Therefore, a method is needed to control dispensing accuracy due to temperature variation.

Flow Regulator

Figure 6:
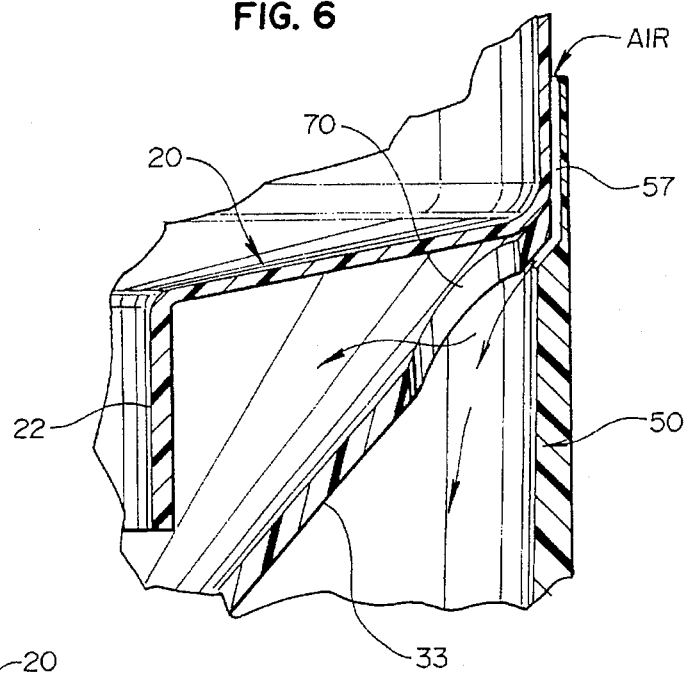
FIG. 6 is a exploded cross-sectional view of a portion of flow regulator 30, in which the flow of outside air is shown entering the flow regulator.
Figure 7:
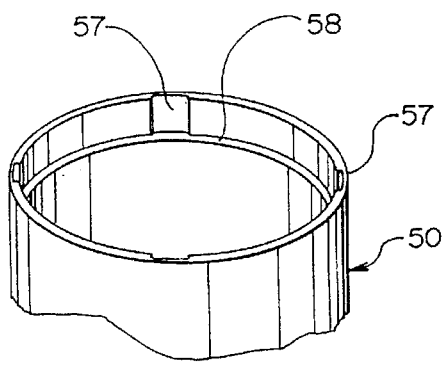
FIG. 7 is a partial side and planar prospective view of the top portion of mounting base 50.

A solution to the problem introduced by temperature variation is to eliminate or reduce the change in pressure due to a temperature change. If the volume can expand or contract without changing the pressure significantly, then the flow regulation would remain accurate. Flow regulator 30 solves this problem. As seen in FIGS. 3–5, the air vent port of my co-pending applications is replaced by cup-shaped flow regulator 30, which includes tapering sidewalls 33, flat bottom surface 34, flow regulator port 31, and air vent ports 70. Bottom surface 34 of flow regulator 30 is spaced from the ends of container nozzle sidewalls 22 a distance G1 (as shown at FIG. 4). Liquid flows from the container into the "cup" (i.e., flow regulator 30) until a liquid level is established in the cup at the container opening, giving a head, H1, as shown in FIG. 4. This prevents further flow out of container 20 since vent air can no longer enter the container through the openings in flow regulator 30. (As illustrated in FIGS. 6 and 7, depressions 57 within mounting base 50 permit outside air entry.) Now, if a temperature increase occurs, the air in container 20 can readily expand, increasing the liquid level in the cup slightly, and raising slightly the head, H1.

Thus, it will now be understood that the volume change, $\Delta V$, due to temperature change, $\Delta T$, can be absorbed by increasing the volume of liquid in the cup, rather than dispensing the liquid through flow regulator port 31. Additionally, the increase in head in the cup to absorb this volume is very small as compared, for example, to the embodiment described in my co-pending applications. For example, in that embodiment a temperature increase of 5° F. caused a 0.139 psi increase in pressure, which acted directly to produce increased flow through the outlet port. This pressure of 0.139 psi is equal to 3.86 in. of water head. With my liquid dispenser, a temperature increase of 5° F. will still cause a change in volume, $\Delta V$, of 0.292 oz. However, this volume will enter the cup, raising the level in the cup an amount equal to $\Delta H1=\Delta V/A$, where A is the cup area $(A=\Pi(D0^2-D1^2)/4)$. For the 32 oz. size container, D0=1.40 inches and D1=0.813 inches. Therefore, $A=1.020$ in.$^2$ and $\Delta H1=0.527/1.020=0.517$ in., which is only 13.4% as large as the pressure increase was in the earlier example. Equally important is the fact that as temperature varies both up and down, the liquid in the cup can rise and fall to maintain pressure equilibrium with minimal effect on flow rate.

Cyclic changes in temperature are likely for plant waterers, liquid air fresheners, and many other applications. Therefore, to maintain accurate periods between dispensing, this method of flow regulation is needed. Small volume air freshener dispensers may not need this feature, although the larger sizes intended for long service life would likely benefit also. The desirable effect of increasing scent molecule concentration to enhance perception can be achieved by setting the dispensing volume and interval.

In some cases it may be desirable to have the flow rate decrease over time. In this case, flow regulator 30 would be a suitable restrictor communicating with the liquid in container 20 and located at the bottom of the container, while the vent air would be introduced at the top of the container, above liquid level. The full head of liquid would act on the restrictor so that the flow rate would be greater at the start, when the container is full, and decrease steadily as the liquid level in the container drops. In other words, the effect would be to simply drain the container through a restricted opening.

Again, this use of flow regulator 30, in combination with timing and dispensing assembly 53, produces a novel method of dispensing an intermittent constant volume at increasing time intervals.

Timing and Dispensing Assembly

In order to complete the task of periodic dispensing of a specific liquid volume, a reliable method is needed to automatically initiate dispensing in response to the passage of a preset period of time, and to dispense the desired amount of liquid. When the flow rate from flow regulator 30 is steady over time, accurate timing and control of dispensing can be achieved using the siphon tube arrangement shown in FIGS. 3–5. Liquid from flow regulator 30 flows freely into timing and dispensing assembly 53, positioned directly below flow regulator port 31. Flow out of timing assembly 53 is prevented until the liquid level rises above inverted U-tube 40, which acts as a siphon. Inlet port 41 of U-tube 40 is open near the bottom of timing assembly 53, while the other end of U-tube 40 passes through the wall of the assembly and terminates in an outlet port 48. Outlet port 48 is sealed against any flow or leakage around its point of passage through assembly 53. As the liquid level rises in assembly 53, it also rises in U-tube 40, entering through inlet port 41. Once the liquid level rises to the top of U-tube 40, it flows out the other side and through outlet port 48. In this fashion all of the liquid in assembly 53 is siphoned through tube 40 and dispensed. The dispensing cycle period is uniform since the flow into assembly 53 from flow regulator 30 is the same from one period to the next.

It has been found that U-shaped tube 40 must be positioned and sized appropriately for proper operation. If inlet port 41 is too close to the bottom of timing assembly 53, an alternating pattern of air bubbles and liquid is drawn into U-shaped tube 40 as the liquid drains from timing assembly 53. This can break the siphon action and leave U-shaped tube 40 filled or partially filled with air bubbles and liquid. This creates significant resistance to flow so that on the next cycle, U-shaped tube 40 may not refill, but can lock up and fail to siphon off liquid volume at the appropriate time. To avoid this problem, inlet port 41 should be located above the bottom surface of timing assembly 53 by a sufficient distance (related to the surface tension of the liquid) so that air bubbles do not form in the tube. This is most easily determined by means of empirical testing. At the correct distance, timing assembly 53 will empty fully with no formation of air bubbles. In addition, inlet port 41 must be effectively parallel to the bottom surface of timing assembly 53. This will allow the surface tension of the liquid to form a skirt at inlet port 41. This surface tension skirt allows the liquid to quickly separate from the end of the tube, so no air bubbles form. Thus, this skirt allows the siphon action to empty the timing assembly, permitting tube 40 to clear so that it refills properly on the next cycle. As one example, when the liquid is water and the application is plant watering, for a typical plant waterer configuration and typical size, the inlet port 41 should be about 3/16 inch above the bottom surface of timing assembly 53.

Another problem has been found to occur with U-shaped tube 40. If the flow of liquid through tube 40 is too rapid, air bubbles can form along the trailing edge of the liquid slug as it flows out of the tube. Once again, these air bubbles add resistance so that tube 40 can fail to refill properly on the next cycle. The solution to this problem is to restrict outlet port 48 slightly to slow the velocity of liquid flowing through tube 40. This provides an unbroken air/liquid interface at the trailing edge of the liquid slug as it clears tube 40. A small amount of liquid remains hanging on outlet port 48 due to surface tension, but this has been found to be easily pushed out as the liquid level in the timing assembly rises and pushes into inlet port 41 of tube 40. As an example, using water in a typical plant waterer configuration, an inlet tube 40 diameter of 0.125 inch and outlet tube 48 diameter of 0.094 inch have been found to work effectively.

Although the sizes for air freshener dispensers will generally be smaller than for plant waterers, the same general design principles apply. Thus, it will now be understood that in those cases where the flow from flow regulator 30 is not constant, but increases or decreases with the liquid level in the container, timing and dispensing assembly 53 will still deliver a constant volume, but the period between dispensing cycles will decrease or increase, respectively, as the level in the container drops.

Figure 9:
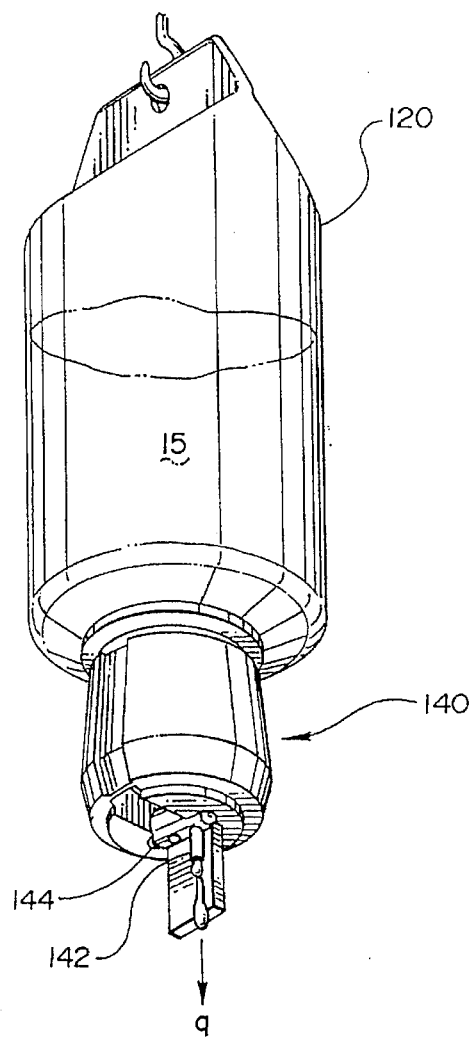
FIG. 9 is a perspective view of the liquid dispensing apparatus disclosed in U.S. Pat. No. 5,409,135.

An example of an increasing flow rate given a decreasing container liquid level will now be described. Referring now to FIGS. 9 and 10, the liquid dispensing apparatus described in my co-pending U.S. Ser. No. 07/833,831 is shown. This apparatus includes an inverted container 120 and a liquid dispensing nozzle 140. Nozzle 140 includes liquid discharge conduit 142 and air intake passageway 144. The lower-most end of liquid discharge conduit 142 is positioned below the upper-most end of air intake passageway 144. Referring to FIG. 10, liquid discharge conduit 142 terminates in liquid discharge port 142A, and air intake passageway 144 terminates at its upper-most end in air intake port 144A. Each port is in fluid communication with liquid 15 within container 120, and a differential head H1 is established. This head causes forces to be generated at the interface of each of the ports 142A and 144A acting against the surface tension of the liquid exposed at each of these ports, and tending to move the liquid at each port in opposite directions. This phenomenon, shown in FIG. 10, increases the differential head and accelerates the growth of a droplet at liquid discharge port 142A, and the growth of an air bubble at air intake port 144A. This continues until a discrete droplet is dispensed at liquid discharge port 142A, and a discrete air bubble separates from air intake port 144A and rises to the surface of the liquid level inside the container. This reestablishes the original differential head, and the process continues in a reoccurring fashion.

It will be understand from the foregoing that with the dispensing apparatus shown in FIGS. 9 and 10, as the temperature increases under normal environmental thermostat controls, the air pressure above the decreasing liquid level in the container also increases due to thermal expansion of the air, exerting an increased pressure pushing down on the liquid in the closed container. This added air pressure increases the overall differential head, resulting in an increase of the effective head and a corresponding increased dispensing rate.

Therefore, in the air freshener application, if only the flow regulator shown in FIGS. 9 and 10 is used, the concentration of the air freshener will tend to increase over time, helping to offset the physiological characteristic in humans in which sensitivity to a scent diminishes over time.

Figure 11:
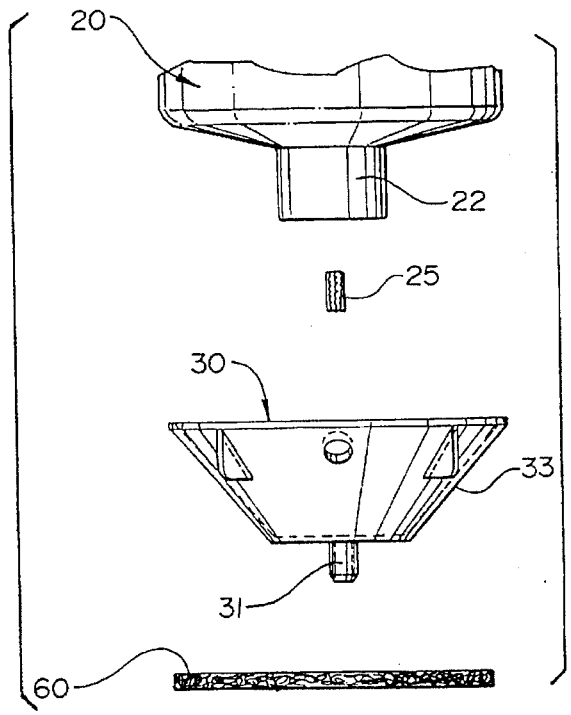
FIG. 11 is an exploded partial cross-sectional view of a flow regulator of my design illustrating the use of an absorbent pad for evaporation augmentation of the dispensed liquid.

Liquid air freshener from the flow regulator can be permitted to flow onto any means capable of augmenting the evaporation of the air freshener into the air, such as an absorbent pad 60 (as shown in FIG. 11), a hot plate, an air stream, etc. Alternatively, if a consistent amount of air freshener is required, the liquid air freshener can be permitted to flow from the flow regulator of the cup configuration shown in FIGS. 1–5. Either type of flow regulator can be used with or without the timing and dispensing assembly described above.

With regard to virtually any embodiment which my automatic liquid dispensers may take, an effective use of the flow regulators described here or in my co-pending applications can be made in the absence of the timing and dispensing assembly described above. In any one of these alternative embodiments, of course, the hydrophilic restrictors described here may be used to induce liquid flow from a container through capillary action.

Improved Flow Restrictor

Turning now to the subject of the present invention, and generally referring to FIGS. 12–16, an improved flow restrictor is now described. First, a flow restrictor, such as fibrous cord 25, is placed within loose-fitting metal sleeve 110. The sleeve should initially be loose-fitting so that the cord material can be easily slid into the sleeve. (This aids in automating the process of stringing the sleeve onto the cord.) The cord/sleeve assembly is then press-fit within aperture 125 of flow regulator 30, as shown in FIGS. 12 and 13.

Sleeve 110 is now crimped or otherwise mechanically compressed in the direction of arrows A, such as by crimping jaws 130, as shown in FIG. 14. Simultaneous with the crimping of metal sleeve 110, air at a predetermined low pressure is supplied to one end of the sleeve; the air flow is shown by arrows B in FIG. 14. Large sleeve 150 is placed within cup 30 and over the upper end of sleeve 110, forming a seal over cup 30 so that the air must flow through restrictor 25. As sleeve 110 is crimped, the air pressure across the restrictor is measured using gauge 140. (Gauge 140 can be connected to two sensors (not shown), each placed at an open sleeve end.) Once a predetermined air pressure drop is reached, sleeve compression ceases.

Figure 16:
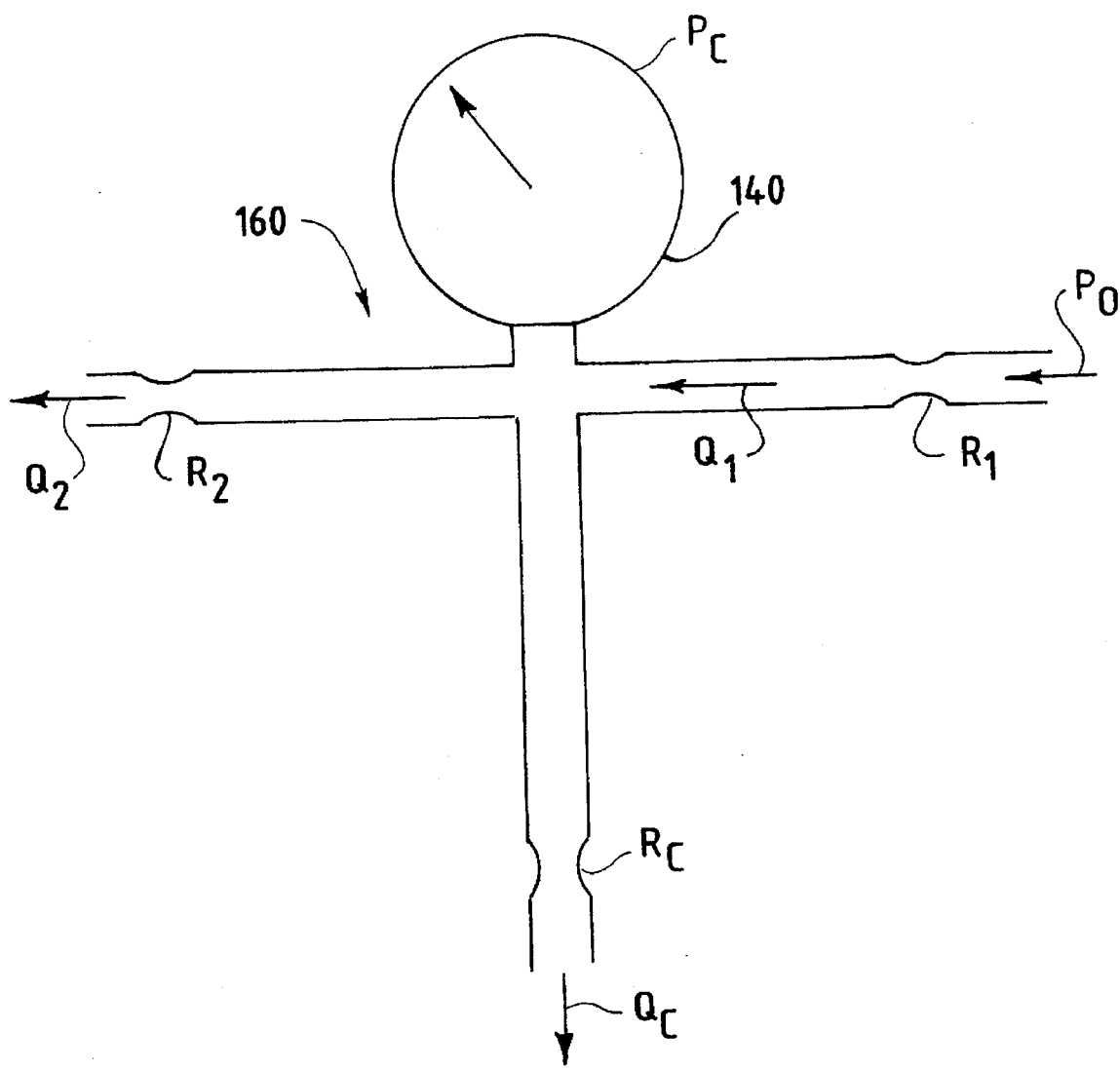
FIG. 16 is a schematic view of a flow restrictor calibrator for use in fabricating the flow restrictor of the present invention.

Referring now to FIG. 16, a calibrator, generally designated as 160, is disclosed. Calibrator 160 is used for determining the required air pressure necessary to fabricate a flow restrictor with desired flow rates at given pressures. A laminar flow using a newtonian fluid is assumed. Po is the supplied air pressure (a constant), and Pc is the pressure across the restrictor (i.e., the pressure to be calibrated). The various flow rates at a given point are designated by "q". R1 and R2 are upstream and downstream restrictor constants, respectively, while Rc is the restrictor constant to be calibrated. For a linear relationship, $q=1/r(\Delta P)$, where $\Delta P$ is the pressure drop across the restrictor. Since q1=q2+qc, and assuming R1=R2, it can be calculated that Pc=Po/(2+R/Rc). It will be appreciated, therefore, that once a constant "R" value is determined for a desired flow rate (and therefore a calibrated pressure for this desired flow rate is derived), this can be used to establish all other desired flow rates. Following calibration, the sleeve/restrictor assembly is then compressed until the predetermined pressure Pc is reached.

Given the foregoing, those of ordinary skill in the art will understand how to correlate between air and other newtonian fluids (i.e., the "R" value for other newtonian fluids is equal to the "R" value for air multiplied by the viscosity for the fluid divided by the viscosity for air). Thus, at 60° F., the "R" value for water is equal to 63.10 multiplied by the "R" value for air.

The flow restrictor of the present invention can be used with various liquids, including aqueous-based liquids or organic-based liquids. If the liquid to be dispensed is water, the restrictor should be hydrophilic.

Depending upon the particular application, the flow restrictor of the present invention can be made of various materials. One material that has been successful is a cord of polyester acrylic fibers. The selected material should be compatible with the dispensed liquid and should not swell, shrink, or deteriorate in the presence of the dispensed liquid.

While fibrous materials are preferred, porous materials that can be deformed (such as sponge) can also be used. It is believed, however, that the longitudinally oriented fibers of fibrous materials provide a linear flow path and more highly laminar (and thus more predictable) flow than other materials that might be used.

Those of skill in the art will understand that while air is disclosed to be used to calibrate the flow restrictor, other gases or even liquids could be used, as well. However, at least for dispensing apparatus with microflow dispensing rates, it is preferable to work with a gas, such as air, since using a liquid to calibrate the flow restrictor will require long periods of time for sufficient dispensing to take place for this purpose.

An example of a compressed sleeve and restrictor assembly is shown in FIG. 15. Preferably, the sleeve compression control and the air flow rate control (whether mechanical, electrical or fluidic) are linked, so that once a predetermined air pressure drop across the flow restrictor is reached, sleeve compression will automatically cease. Also, given a particular application, it may be advantageous to crimp at several locations, radially and equally-spaced around the sleeve perimeter.

It has been found that the fabrication of flow restrictors according to this method produces flow restrictors with consistent dispensing rates independent of fiber cord tension and density variations, and independent of sleeve dimensional tolerances.

A specific application of the present invention will now be disclosed. Assume, with the plant waterer application disclosed here, that a desired water dispensing rate is 2 ounces over 84 hours. Given a head of ⅜ inches (i.e., H1 in FIG. 4 is ⅜ inches), it has been calculated and experimentally verified that a flow restrictor must be used that has a calibrated pressure (Pc) equal to a water column of 9.4 inches.

The present invention therefore permits the fabrication of flow restrictors providing various specified dispensing rates at given pressures across the restrictor. In this manner a high volume production rate can be maintained in which flow restrictors are fabricated having precise, predetermined flow rates at given pressures.

This improved flow restrictor can generally be used as a flow control in a wide variety of fluidic systems. Thus, while it can be used with my automatic liquid dispensers, it can also be used in a variety of other applications. One such other application would be with pneumatic or hydraulic cylinders which are required to work very slowly, and which therefore require means to limit flow to low rates.

Another application would be as a gauge damper. With a pulsating pressure line, an average pressure could be measured despite the pulsations through the use of a flow restrictor control of the present invention. In other words, the flow restrictor control would act as a damper.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

What is claimed is:

1. A method for making a device to control the flow of a fluid, the device providing specifically known flow rates over given pressures, comprising the steps of:

placing a compressible flow restrictor within a tubular sleeve having an axial direction and open ends, the sleeve in its axial direction entirely surrounding the outside periphery of the flow restrictor;

radially compressing the sleeve transverse to the axial direction of the sleeve;

directing air at a predetermined pressure through the open ends of the sleeve and through the flow restrictor in the axial direction of the sleeve, simultaneous with the sleeve compression; and measuring the air pressure across the flow restrictor during sleeve compression, and ceasing sleeve compression when a predetermined air pressure is reached, to thereby provide a flow restrictor with known pressure and flow characteristics.

2. The method of claim 1 for making a flow control device, wherein the sleeve is made from a ductile material.

3. The method of claim 1 for making a flow control device, wherein the fluid is aqueous-based and the flow restrictor is hydrophilic.

4. The method of claim 1 for making a flow control device, further comprising the step of using the flow restrictor in association with a flow regulator for dispensing the fluid.

5. The method of claim 1 for making a flow control device, wherein the flow restrictor is a fibrous cord.

6. The method of claim 1 for making a flow control device, wherein the sleeve compression step includes the use of adjustably controlled crimping jaws.

7. The method of claim 6 for making a flow control device, wherein the predetermined air pressure is adjustably controlled.

8. The method of claim 7 for making a flow control device, wherein the control of sleeve compression is linked with the control of the predetermined air pressure.

9. An automatic liquid dispensing apparatus for the microflow dispensing of a controlled volume of liquid, comprising:

a container adapted to hold a dispensable liquid, thereby defining a liquid level within the container;

a flow regulator in fluid communication with the container, the flow regulator being configured to permit a controlled rate of flow of the liquid out of the container, the controlled rate being independent of the liquid level within the container;

a compressible flow restrictor having an outside periphery and being associated with the flow regulator, the outside periphery of the flow restrictor being entirely surrounded by a tubular sleeve having an axial direction and open ends;

whereby, upon directing a flow of air at a predetermined pressure through the flow restrictor in the axial direction of the sleeve, and simultaneous radial compression of the sleeve until a predetermined air pressure across the flow restrictor is reached, a flow restrictor is provided having known flow rates over given pressures.

* * * * *